(12) United States Patent
Kumar (10) Patent No.: US 9,710,338 B1
(45) Date of Patent: Jul. 18, 2017

(54) VIRTUAL MACHINE DATA RECOVERY

(75) Inventor: Sunil Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 151 days.

(21) Appl. No.: 13/174,326

(22) Filed: Jun. 30, 2011

(51) Int. Cl.
*G06F 11/14* (2006.01)

(52) U.S. Cl.
CPC .................. *G06F 11/1469* (2013.01)

(58) Field of Classification Search
CPC ............ G06F 11/1469; G06F 11/1471; G06F 17/3008
USPC ................ 707/674, 610, 640, 661, 707/999.202–999.204; 711/162, 165, 6; 718/1
See application file for complete search history.

(56) References Cited

U.S. PATENT DOCUMENTS

| | | | |
|---|---|---|---|
| 6,269,431 B1 * | 7/2001 | Dunham | 711/162 |
| 8,046,550 B2 * | 10/2011 | Feathergill | 711/162 |
| 8,869,145 B1 * | 10/2014 | Barve et al. | 718/1 |
| 2008/0250222 A1 * | 10/2008 | Gokhale et al. | 711/203 |
| 2010/0241654 A1 * | 9/2010 | Wu et al. | 707/769 |
| 2012/0136831 A1 * | 5/2012 | Wang | 707/640 |
| 2012/0284236 A1 * | 11/2012 | Timashev et al. | 707/674 |

* cited by examiner

*Primary Examiner* — Syling Yen
(74) *Attorney, Agent, or Firm* — Krishnendu Gupta; Joseph D'Angelo (57) ABSTRACT

A system, program product, and computer implemented method for recovering data from a Virtual Machine (VM), comprising selecting a back-up of back-ups of one or more LUNs, using a virtual server to mount a drive to a VM in the virtual server from the selected back-up of the back-ups, and retrieving data from the drive mounted to the VM.

20 Claims, 11 Drawing Sheets

VIRTUAL MACHINE DATA RECOVERY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to co-pending U.S. patent application, filed even date, Ser. No. 13/174,305 entitled "VIRTUAL MACHINE BACK-UP," which is hereby incorporated by reference in its entirety. This application is related to co-pending U.S. patent application, filed even date, Ser. No. 13/174,341 entitled "ESTABLISHING A MAPPING TO A VIRTUAL DISK," which is hereby incorporated by reference in its entirety.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Virtual processing such as VMware is another known area that offers advantages in data processing, including in the area of apparent configuration to a user. It would be advancement in both the virtual processing and data storage arts to exploit better the respective individual capabilities for reaping more and better benefits for users in the respective fields.

SUMMARY

A system, program product, and computer implemented method for recovering data from a Virtual Machine (VM), comprising selecting a back-up of back-ups of one or more LUNs, using a virtual server to mount a drive to a VM in the virtual server from the selected back-up of the back-ups, and retrieving data from the drive mounted to the VM.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

In an embodiment, the current disclosure may enable recovery of data from a virtual Machine (VM), without having to restore the whole Virtual Machine File System (VMFS) of the VM. In some embodiments, a single file may be recovered from a VMFS of a VM. In other embodiments, the data may be recovered outside the active VM on a proxy host which could be another VM. In further embodiments, the data may be recovered on the same VM. In certain embodiments, the recovery process may only recovery the single file of the VM, not multiple files and not multiple VMs.

Typically, an ESX, VM server, or hypervisor, used interchangeable herein, may be software that runs one or more virtual machines (VM). Generally, Virtual Machines (VM) are backed-up to protect the data on the VM, where the data is typically in the form of a Virtual Machine File System (VMFS). Often, the VM may be backed up using continuous data protection methods. Yet, conventional techniques usually require recovery of the entire VMFS when data loss occurs. Usually, recovery of the data of a single VM may require the recovery of the data of multiple VMs. Generally, specific VM solutions, such as provided by VMW, usually require reverse synchronizing from an any point in time (APIT) copy to the source VMFS.

Typically, most of this data is not needed as the data loss or corruption may be limited to a single VM's data e.g. some specific folder or files (among tens of others VM). Often, the other data is restored as well because the conventional restore techniques, such as APIT, represent the complete copy/snaps of the entire underlying storage (i.e. LUNS). Usually, the conventional restore techniques have no insight in what data is stored where on the LUN and how this may correspond to the VMS. Thus, conventional techniques may recover more data than is necessary which may revert the whole VM to an earlier point in time. As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

Virtual machine technology, including the ESX server is described in U.S. Pat. No. 6,397,242 to Devine et. al, issued May 28, 2002 and assigned to VMware, a majority owned subsidiary of EMC Corporation, the assignee of the present invention. This '242 patent is hereby incorporated in its entirety by this reference. The virtual machine technology interacting with a data storage environment is described in U.S. Pat. No. 7,552,279 to Mark Gandler issued Jun. 23, 2009 and assigned to EMC Corporation, the assignee of the present invention. This '279 patent is hereby incorporated in its entirety by this reference. Consequently, the following discussion makes only general references to the operation of such virtual machine technology.

Figure 1:
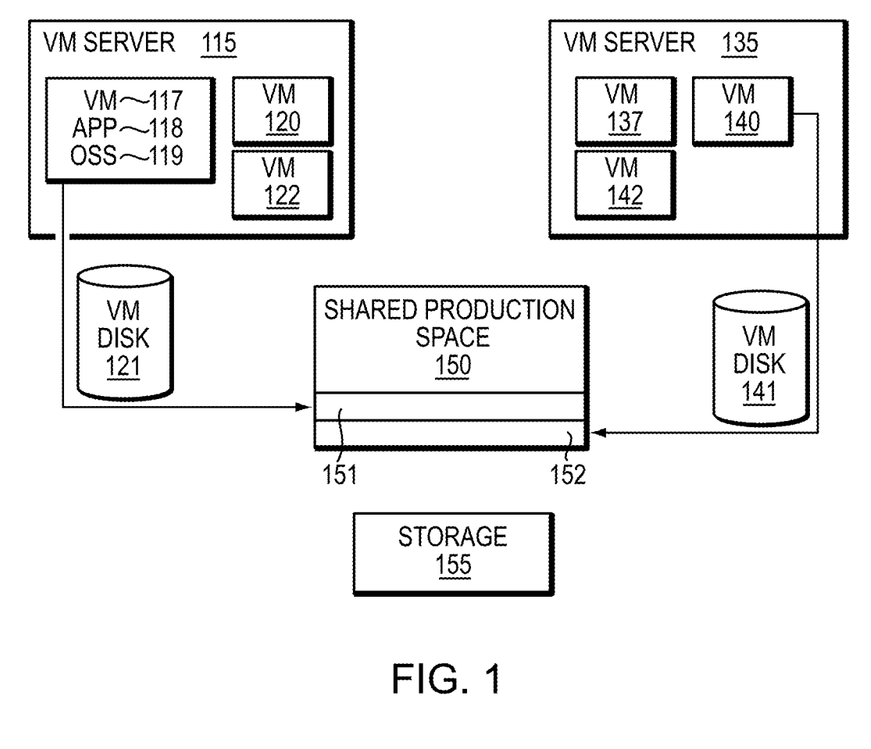
FIG. 1 is a simplified illustration of VM servers and a shared production space, in accordance with an embodiment of the present disclosure.
Figure 2:
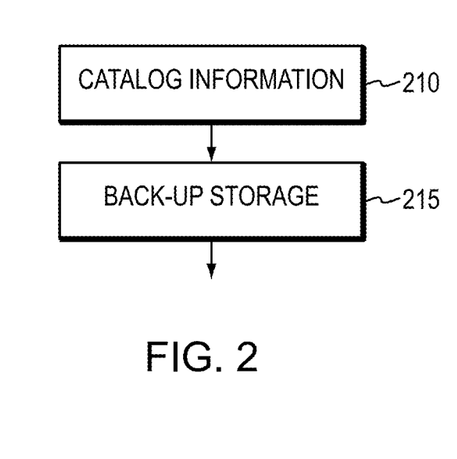
FIG. 2 is a simplified method, in accordance with an embodiment of the present disclosure.

Refer now to the example embodiments of FIGS. 1 and 2. In FIG. 1, there are two VM servers, 115, 135. Note, the term VM server may also be used interchangeably with hypervisor. Each VM Server has a number of VMs, such as VMs 117, 120, 122, 137, 140, and 142. The VMs, such as VM 117 have application space 118 and OS space 119. Each VM also has a VM disk, for example VM 117 has VM Disk 121 and VM 140 has VM disk 141. The VMs share shared production space 150 to store the VM disks. Shared production space 150 is stored on storage 155.

The information about VM 117 may be cataloged (step 210). In some embodiments, the catalog information for the VM may include the VM's name, configuration file, i.e vmx file path, and Virtual Disk Paths of all virtual machine stored on the VMFS. In certain embodiments, this information may be stored in a database. Storage 155 may be backed up (step 215). In certain embodiments, this back-up may include any point in time (APIT) protection.

Figure 3:
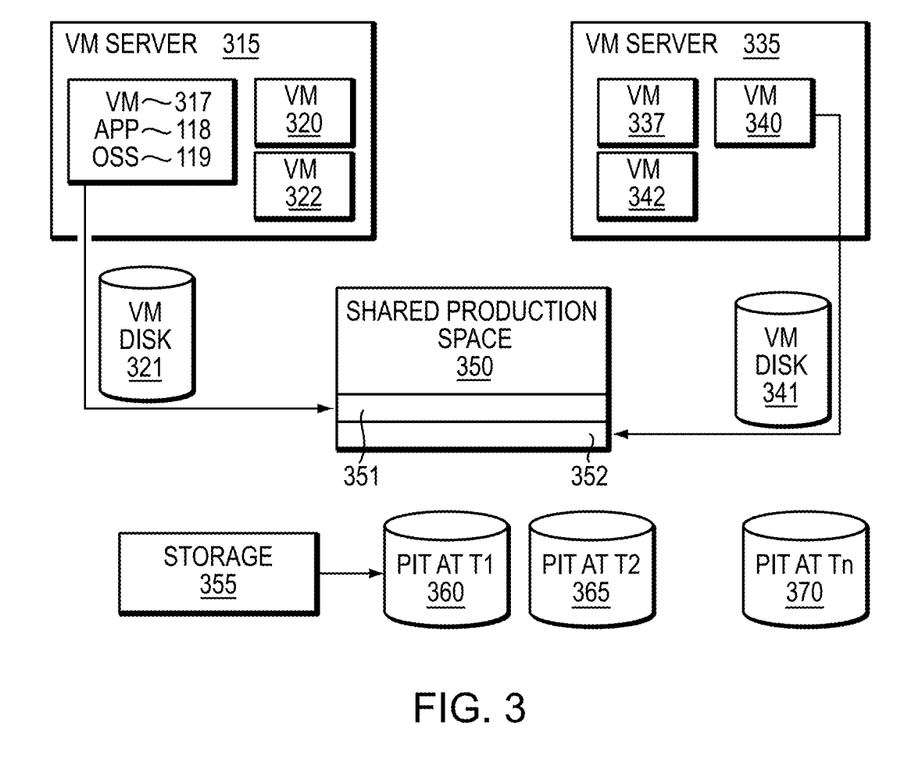
FIG. 3 is a simplified illustration of VM servers, a shared production space and Point in Time back-ups, in accordance with an embodiment of the present disclosure.
Figure 4A:
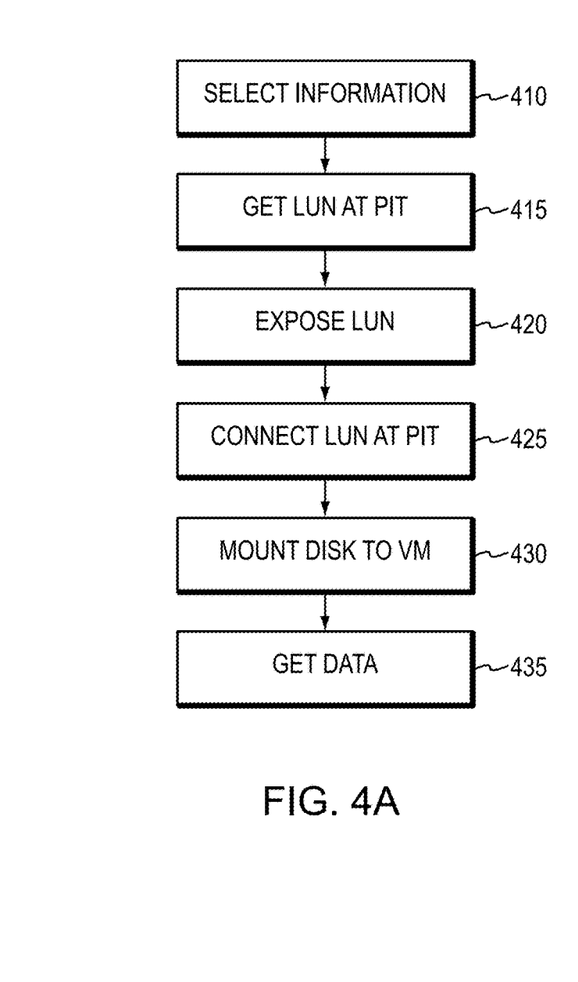
FIG. 4a is a simplified method for restoring data, in accordance with an embodiment of the present disclosure.
Figure 4B:
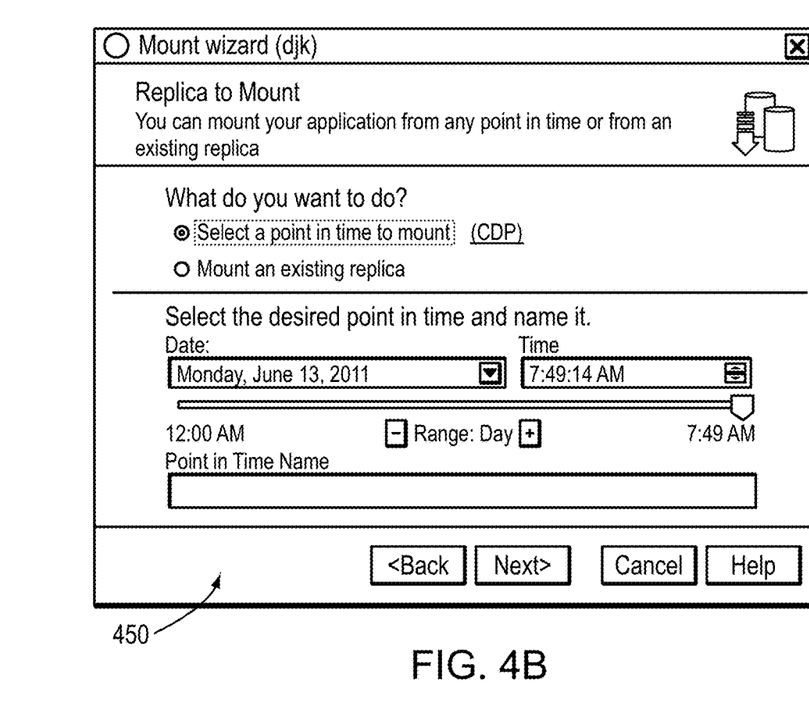
FIG. 4b is a simplified Graphical User Interface (GUI) for restoring data, in accordance with an embodiment of the present disclosure.

Refer now to the example embodiments of FIGS. 3 and 4a, and 4b. In these examples, there has been data loss. Information about the point to be recovered is selected (step 410). For example, a point in time, such as PIT at T2 365, may be selected before the data loss had occurred. In other embodiments, the specific VM to be recovered may be selected. In still further embodiments, a particular file on a particular VM may be selected. In alternative embodiments, the VM and file information may be indexed by time. In some embodiments, a user may make the selection before the data loss had occurred. In certain embodiments, the user may make the selection from a GUI, such as GUI 450 of FIG. 4b. In other embodiments, the user may make the selection from a command prompt. In further embodiments, the selection may automatically be made corresponding to a selection before the data loss occurred. PIT at T2 364, may be accessed. In certain embodiments, the recovery or back-up software may create a LUN from the any point in time replica (step 415).

Figure 5:
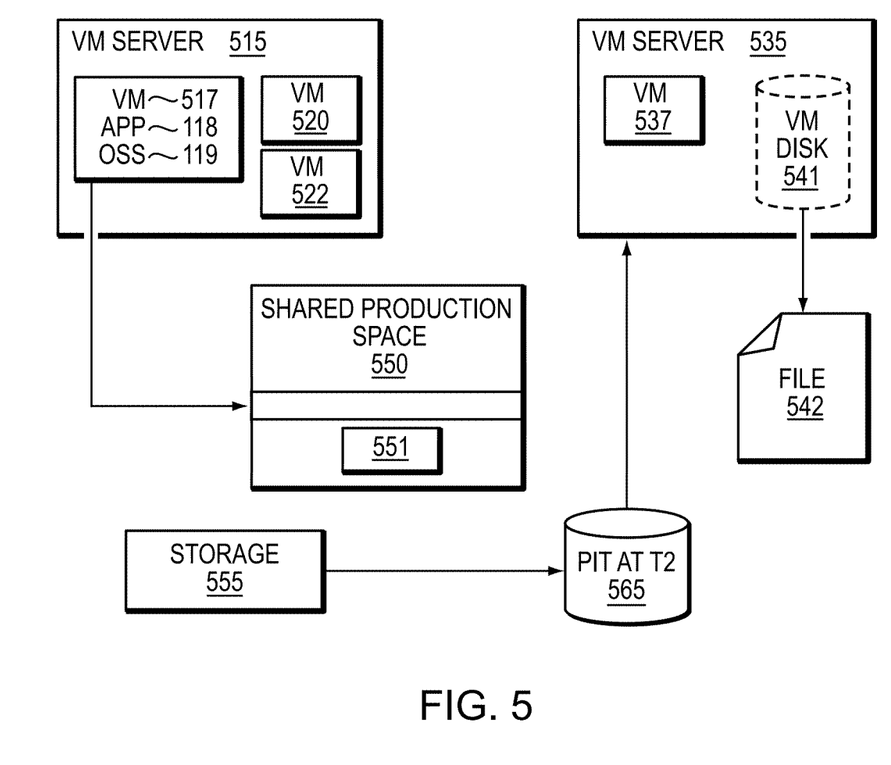
FIG. 5 is a simplified illustration of VM servers, a shared production space and Point in Time back-ups, in accordance with an embodiment of the present disclosure.

Refer now to the example embodiments of FIGS. 4 and 5. LUN 565 may be exposed to a VM server 535, which in certain embodiments may be an ESX server (step 420). In certain embodiments, the VM server may need to have certain connectivity in place. In a particular embodiment, in case the data is required to be recovered on the source VM, the VM server may have to be the same on which the source VM is running.

Figure 6:
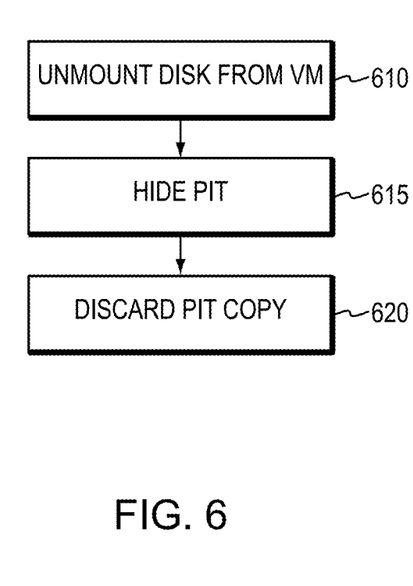
FIG. 6 is a simplified method for unmounting a Point in time image, in accordance with an embodiment of the present disclosure.

The VM server may mount PIT 565 (step 430). The VM server connects VM 537 to VM disk 541 via PIT 565 (step 435). Data 542 is recovered (step 435). Refer now to the example embodiments of FIGS. 5 and 6. VM disk 541 is unmounted from VM 537 (step 610). PIT LUN 565 is hidden from VM server 535. The PIT LUN is discarded (step 620).

Figure 7:
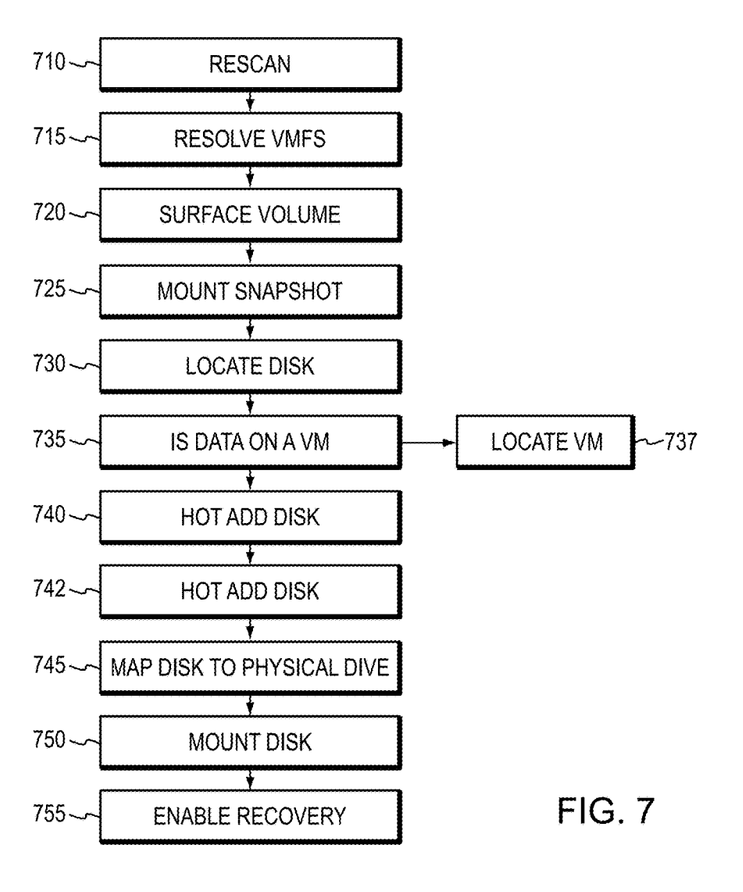
FIG. 7 is a simplified method for restoring data on an ESX server, in accordance with an embodiment of the present disclosure.
Figure 8:
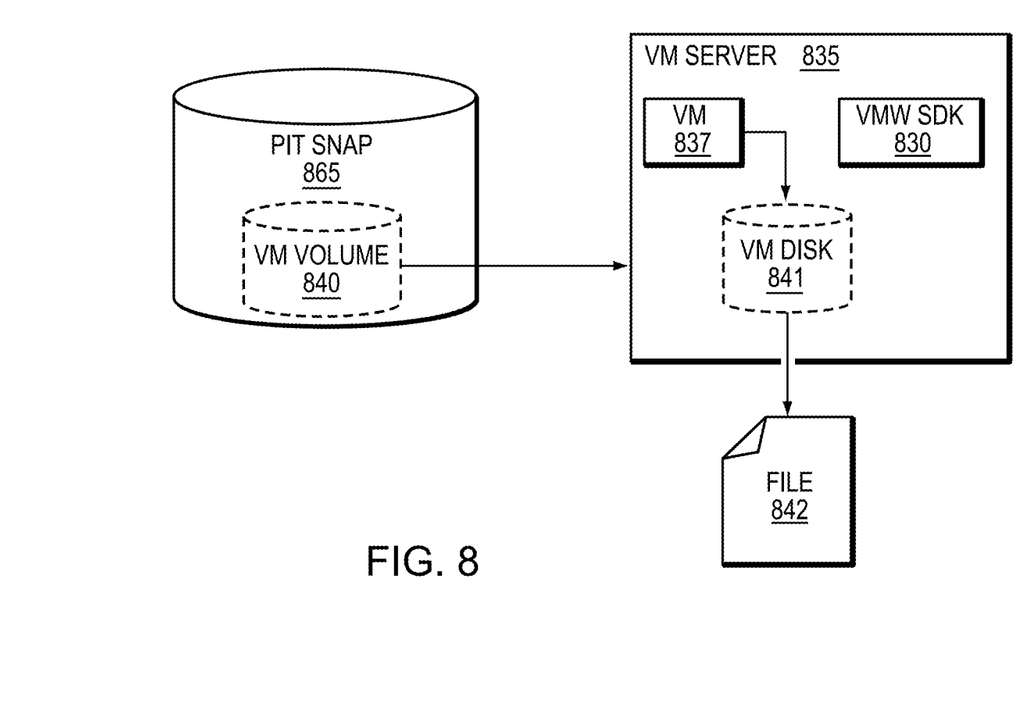
FIG. 8 is a simplified illustration of mounting a PIT snap on a VM server, a shared production space and Point in Time back-ups, in accordance with an embodiment of the present disclosure.

Refer now to the example embodiment of FIG. 7 which provides an example implementation of a recovery using a VMW ESX server. The recovery process uses VMware SDK 830 to issue a HBS rescan on ESX 835 on which the APIT or snapshot 865 is presented as one or more LUNs (step 710). The recovery process uses the VMware SDK 830 to resolve the VMFS volume 840 present on the APIT LUNS 865 (step 715). ESX server 835 surfaces the LUNs as snapshot VMFS volume 840 on ESX host 835 (step 720). Snapshot 840 is mounted on ESX host 835. VM disk 841 is mounted to VM 837 (step 725). The recovery process locates the selected disk 841 (step 730). If the data is on a specific VM (step 735), the recover process locates the virtual machine 837 where the data is to be recovered (step 737).

On disk 841 where VM 837 is located, recovery hot-adds disk 841 (independent-nonpersistent mode) from the snapshot-VMFS 840 to VM 837 (step 740). Recovery rescans the SCSI bus inside the VM where the disk is hot-added (step 742). VM disk 841 appears as a physical drive inside VM 837. The recovery process disk 841 is added as a physical drive (step 745). Using VDS API, volume 841 is mounted on the physical drive using a drive letter (step 750). The recovery of data at the specified time is enabled (step 755). In some embodiments, the end user may go and copy the required file from this drive letter and complete the recovery. In other embodiments, the file may be automatically copied.

Figure 9:
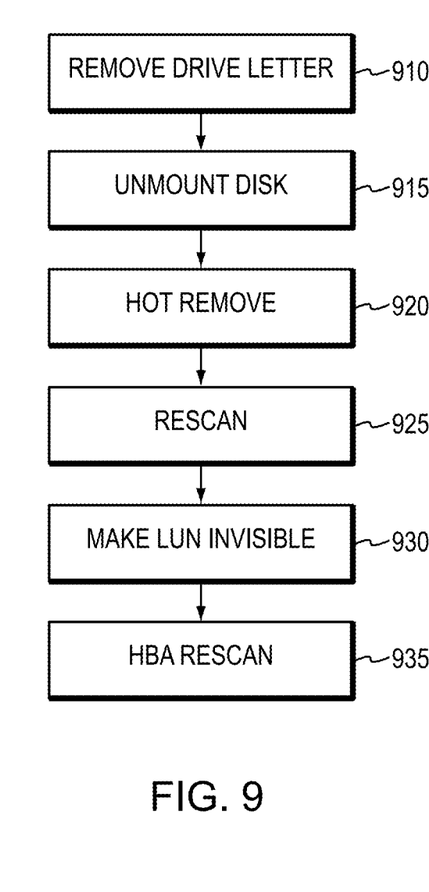
FIG. 9 is a simplified method for unmounting a Point in time image on a ESX server, in accordance with an embodiment of the present disclosure.

In certain embodiments, recovering a file or a bunch of file may be very fast as the data transfer happens is done directly from the underlying Storage LUN to the VM using the ESX storage stack. In certain embodiments, network based I/O is not involved. Refer now to the embodiments of FIGS. 8 and 9. Once the recovery is complete, the recovery process removes the drive letter (step 910). The recovery process un-mounts volume 841 from the physical drive (step 915). The recovery process hot_removes disk 841 from virtual machine 837 (step 920). The recover process issues the scsi rescan command (step 925). The recovery process makes LUNs 865 invisible from ESX 835 (step 930). The recover process issues a HBA rescan (step 935).

Figure 10:
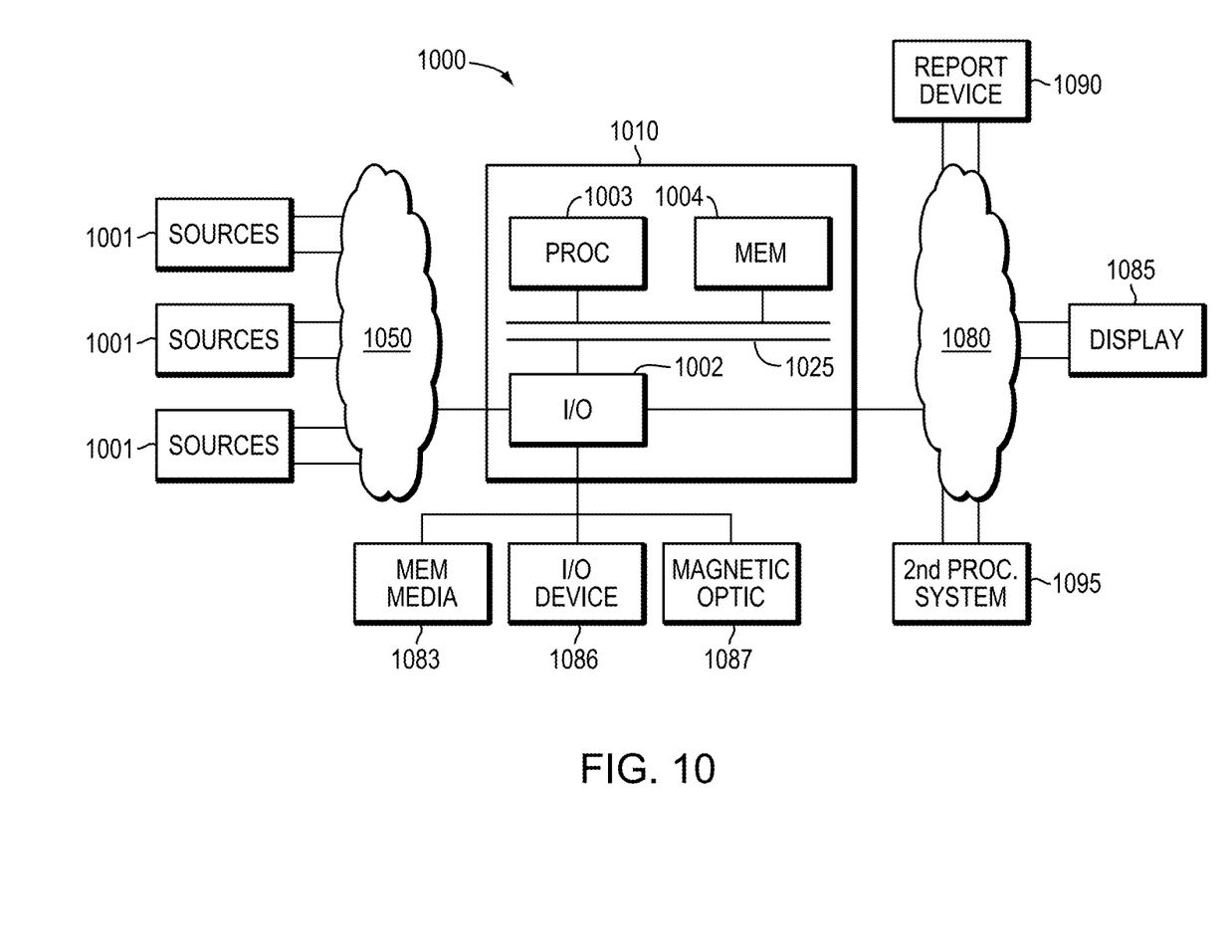
FIG. 10 is an example of an embodiment of an apparatus that may utilize the techniques described herein, in accordance with an embodiment of the present disclosure.
Figure 11:
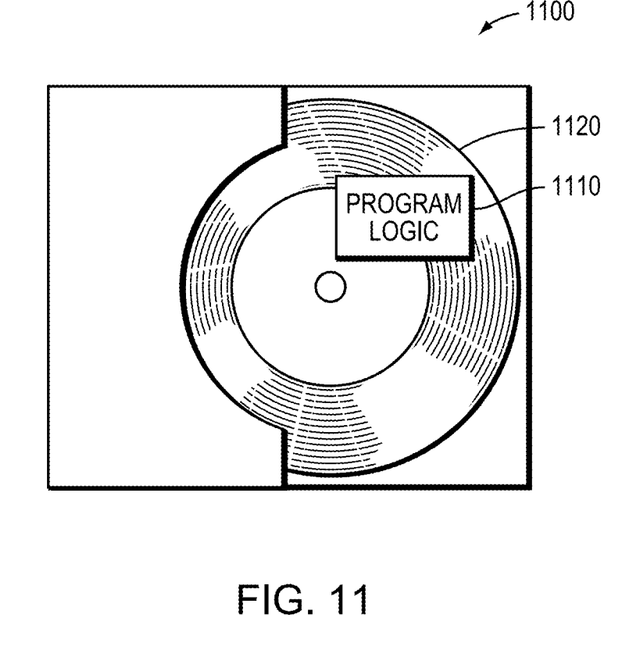
FIG. 11 is an example of an embodiment of a method embodied on a computer readable storage medium that may utilize the techniques described herein, in accordance with an embodiment of the present disclosure.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 10, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 11 shows Program Logic 1110 embodied on a computer-readable medium 1130 as shown, and wherein the Logic is encoded in computer-executable code configured for carrying out the reservation service process of this invention and thereby forming a Computer Program Product 1100.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art may appreciate that the device is not limited to the specific configuration but rather only by the claims included with this specification.

Although the foregoing invention has been described in some detail for purposes of clarity of understanding, it may be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the an will realize that there are many apparent variations that can be applied to the methods and systems described. Thus it will be appreciated that, in addition to data replication systems, the optimal journaling policy of the present invention has widespread application to journaling systems including database systems and version control systems.

In the foregoing specification, the invention has been described with reference to specific exemplary embodiments thereof. It may, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for recovering data from a Virtual Machine (VM), the system comprising:
   a set of Virtual Machines (VMs);
   the set of VMs communicatively coupled to a set of virtual machine file system (VMFS), wherein the VMFS represent a set of file systems available to one or more of the set of VMs; wherein the set of VMs run in a virtual server of a set of virtual servers;
   a first storage medium comprising one or more LUNs, wherein the virtual server stores the VMFS on the storage mediums one or more files on the one or more LUNs, wherein the first storage medium is protected via back-ups; and
   computer-executable logic operating in memory, wherein the computer-executable program logic is configured for execution of:
      in response to a request to recover a file from a virtual machine (VM) at a point in time (PIT); wherein information regarding the VM has been cataloged in a catalog includes a file path and a virtual disk path for the VM;
      determining from a catalog a file path and a virtual disk path for a file in a first VMFS to be restored for a VM of the set of VMs at a point in time (PIT);
      selecting a back-up of the back-ups at the PIT of the one or more LUNs to recover the file in the first VMFS from a first VMFS of the set of VMFS stored as the one or more files on the selected backup of the one or more LUNs;
      exposing the back-up of the back-ups to a selected virtual server of the set of virtual servers;
      using the selected virtual server of the set of virtual servers to access the one or more files containing the VMFS on the selected back-up of the one or more LUNs to mount the first VMFS to a VM in the selected virtual server of the set of virtual servers enabling recovery of a file from the first VMFS absent having to recover the entire first VMFS from the selected backup of the one or more LUNs;
      retrieving the file from the first VMFS of the set of VMFS using the virtual machine and the cataloged information from the catalog without having to recover other data from the first VMFS other than the file to be recovered by copying the file from the first VMFS of the VMFS from the back-up using a storage stack; and
      unmounting the first VMFS from the VM.

2. The system of claim 1 wherein the back-ups are time indexed.

3. The system of claim 1 wherein the VM is running on a second VM server.

4. The system of claim 1 wherein the computer-executable program logic is configured for execution of:
   exposing the back-up to a virtual server.

5. The computer program product of claim 1 wherein the data is a file of a first VMDF of a set of VMDFs.

6. The system of claim 1 wherein the computer-executable program logic is configured for execution of:
   recovering the data from the VM in the virtual server to the VM coupled to the VMFS.

7. A computer implemented method for recovering data from a Virtual Machine (VM), the method comprising:
   in response to a request to recover a file from a virtual machine (VM) at a point in time (PIT); wherein information regarding the VM has been cataloged in a catalog includes a file path and a virtual disk path for the VM;
   determining from the cataloged information in the catalog for the VM the file path and the virtual disk path for the file in a first VMFS to be restored for the VM of the set of VMs at a point in time (PIT);
   selecting a back-up of a set of back-ups at the PIT of one or more LUNs to recover the file in the first VMFS from a first VMFS of a set of VMFS; wherein the set of VMFS is stored in one or more files on the selected backup of the one or more LUNs, wherein the one or more files containing the set of VMFS represents to a virtual server a set of file systems available to one or more VMs;
   exposing the back-up of the back-ups to a selected virtual server of the set of virtual servers;
   using the selected virtual server of the set of virtual servers to access the one or more files containing the VMFS on the selected back-up of the one or more LUNs to mount the first VMFS to a VM in the selected virtual server of the set of virtual servers, enabling recovery of a file from the first VMFS absent having to recover the entire first VMFS from the selected backup of the set of back-ups of the one or more LUNs;

retrieving the file from the first VMFS of the set of VMFS using the virtual machine and the cataloged information from the catalog without having to recover other data from the first VMFS other than the file to be recovered by copying the file from the first VMFS of the VMFS from the back-up using a storage stack; and unmounting the first VMFS from the VM.

8. The computer implemented method of claim 7 wherein the back-ups are time indexed.

9. The computer implemented method of claim 7 wherein the recovery VM is running on a second VM server.

10. The computer implemented method of claim 7 wherein the computer-executable program logic is configured for execution of:

exposing the back-up to a virtual server.

11. The computer program product of claim 7 wherein the data is a file of a first VMDF of a set of VMDFs.

12. The computer implemented method of claim 9 wherein the computer-executable program logic is configured for execution of:

recovering the data from the recovery VM in the virtual server to a VM coupled to a second virtual server.

13. A computer program product for recovering data from a Virtual Machine (VM) comprising:

a non-transitory computer readable medium encoded with computer executable program code for using read signatures in replication, the code configured to enable the execution of:

in response to a request to recover a file from a virtual machine (VM) at a point in time (PIT); wherein information regarding the VM has been cataloged in a catalog includes a file path and a virtual disk path for the VM;

determining from the cataloged information in the catalog for the VM the file path and the virtual disk path for the file in a first VMFS to be restored for the VM of the set of VMs at a point in time (PIT);

selecting a back-up of a set of back-ups at the PIT of one or more LUNs to recover the file in the first VMFS from a first VMFS of a set of VMFS; wherein the set of VMFS is stored in one or more files on the selected backup of the one or more LUNs, wherein the one or more files containing the set of VMFS represent represents to a virtual server a set of file systems available to one or more VMs;

exposing the back-up of the back-ups to a selected virtual server of the set of virtual servers;

using selected virtual server of the set of virtual servers to access the one or more files containing the VMFS on the selected back-up of the one or more LUNs to mount the first VMFS to a VM in the selected virtual server of the set of virtual servers, enabling recovery of a file from the first VMFS absent having to recover the entire first VMFS from the selected backup of the set of back-ups of the one or more LUNs;

retrieving the file from the first VMFS of the set of VMFS using the virtual machine and the cataloged information from the catalog without having to recover other data from the first VMFS other than the file to be recovered by copying the file from the first VMFS of the VMFS from the back-up using a storage stack; and unmounting the first VMFS from the VM.

14. The computer program product of claim 13 wherein the back-ups are time indexed.

15. The computer program product of claim 13 wherein the recovery VM is running on a second VM server.

16. The computer program product of claim 13, the code further configured to enable the execution of:

exposing the back-up to a virtual server.

17. The computer program product of claim 15 wherein the data is a file of a first VMDF of a set of VMDFs.

18. The computer program product of claim 15, the code further configured to enable the execution of:

recovering the data from the recovery VM in the virtual server to a VM coupled to the second virtual server.

19. The computer program product of claim 13 wherein the first VMFS is associated with a first virtual machine of the set of VMs and wherein the information about the virtual machine of the set of VMs is cataloged.

20. The computer program product of claim 13 where the set of VMs is on a production site and wherein the back-ups are on a replication site.

* * * * *